No. 648,472. Patented May 1, 1900.
J. C. WALTERS.
HAND RAKE.
(Application filed Sept. 23, 1899.)
(No Model.)
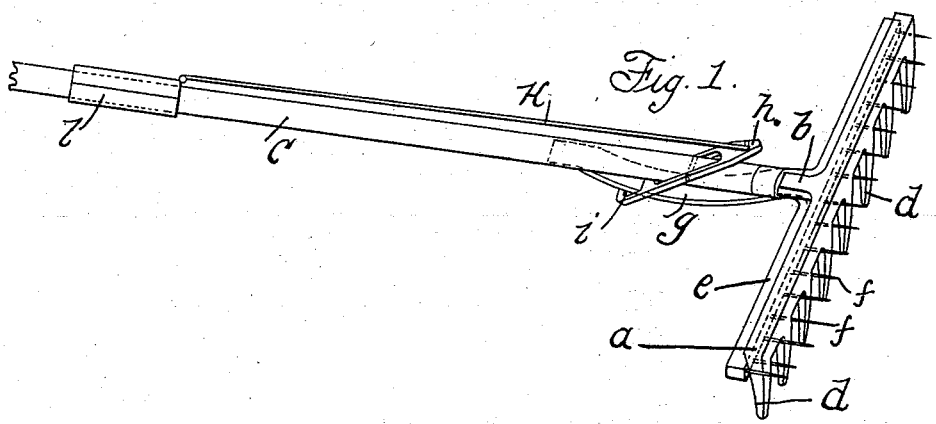
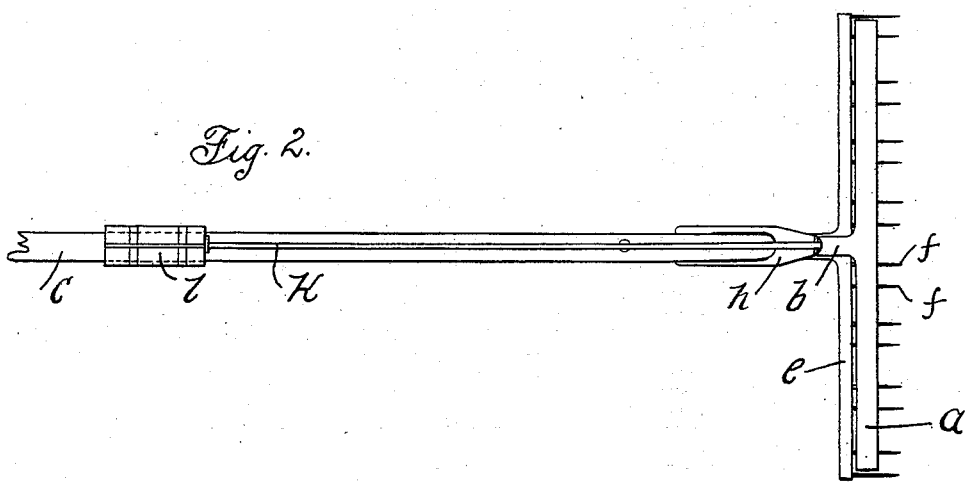
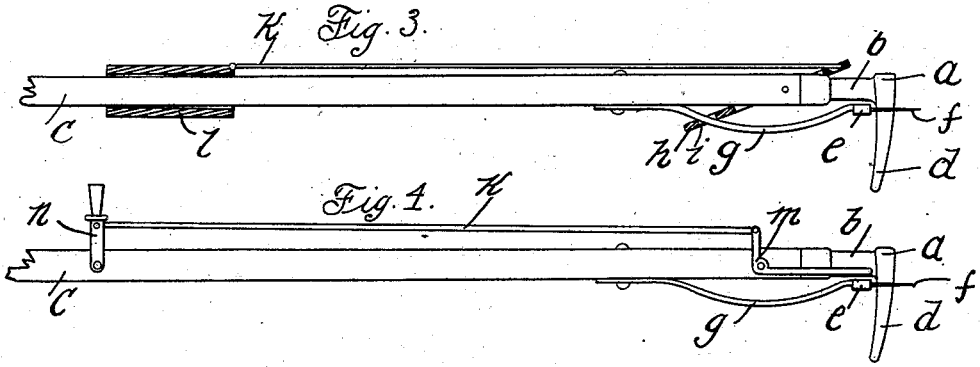
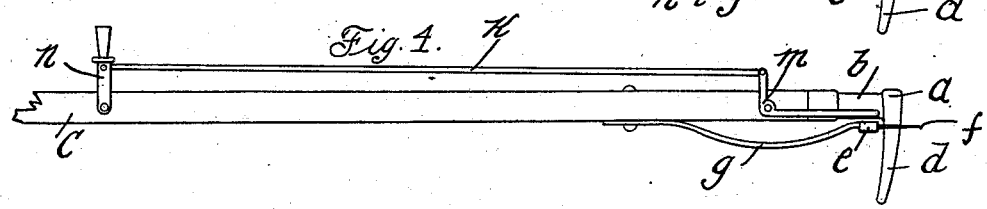
Inventor:
J. C. Walters,
By Charles A. Brown + Cragg
Attorneys.
Witnesses:

UNITED STATES PATENT OFFICE.

JOHN C. WALTERS, OF CANTRALL, ILLINOIS.

HAND-RAKE.

SPECIFICATION forming part of Letters Patent No. 648,472, dated May 1, 1900.

Application filed September 23, 1899. Serial No. 731,487. (No model.)

*To all whom it may concern:*

Be it known that I, JOHN C. WALTERS, a citizen of the United States, residing at Cantrall, in the county of Sangamon and State of Illinois, have invented a certain new and useful Improvement in Hand-Rakes, (Case No. 1,) of which the following is a full, clear, concise, and exact description, reference being had to the accompanying drawings, forming a part of this specification.

My invention relates to gardeners' hand-rakes, and has for its object the provision of an improved cleaning mechanism, in combination with an improved lever mechanism for operating the same, whereby the teeth of the rake may be very effectively and quickly cleaned by the user.

In accordance with my invention I provide an auxiliary or cleaning device preferably comprising a cleaner-head, cleaning-teeth each anchored at one end thereto and having their free ends projecting forwardly between the rake-teeth, the cleaning-teeth being disposed in a plane angular to the plane in which the rake-teeth lie, a spring for normally holding the cleaning-teeth and their head close to the rake-head, a pivoted lever located near the rake-head for depressing the cleaning-teeth toward the points of the teeth of the rake, a sliding sleeve surrounding the rake-handle near the user's hands, and a link extending longitudinally of the handle and uniting the said sleeve and lever.

In practicing my invention I preferably employ as the cleaning element a device in the form of a supplemental rake, this supplemental cleaning-rake having two teeth for each tooth of the main rake and snugly inclosing the same to afford space between the cleaning-fingers, whereby the cleaner may be combined with the rake without sacrificing any of the effectiveness of the rake, as the space between the teeth thereof is not filled by the cleaning-teeth.

I will explain my invention by reference to the accompanying drawings, in which—

Figure 1 is a perspective view of a rake constructed in accordance with the invention. Fig. 2 is a plan view of the rake shown in Fig. 1. Fig. 3 is a side elevation, partly in section, of the rake shown in Figs. 1 and 2. Fig. 4 is a side elevation of a modification of my invention.

Like parts are indicated by similar letters of reference throughout the different views.

The rake is of well-known construction, being provided with a transverse head $a$, having a tang $b$ for insertion within the rake-handle $c$. The rake-teeth $d$ project from the rake-head transversely to the rake-handle. An additional head $e$ is provided underneath the handle or tang, this head supporting a number of cleaning-fingers $f$, extending longitudinally of the handle between the fingers of the rake. Each rake-tooth is closely embraced by two cleaning-teeth, so that the space between the points of the teeth and the head and the space between adjacent teeth is not entirely filled up, the matter that is raked up being capable of reaching the rake-head. Moreover, by placing the cleaning fingers or teeth close to the rake-teeth the matter is more readily cleaned away. The cleaning-teeth are each anchored at one end to the head $e$, the other ends of the teeth being free and unconnected. The cleaning-teeth are of sufficient length so that as the head $e$ is moved toward the points of the rake-teeth, as will hereinafter be set forth, the cleaning-teeth will not be withdrawn from between the rake-teeth.

The head $e$ is mounted upon one end of a strip metal spring $g$, provided on the under side of the rake-handle and curving downwardly therefrom at its middle portion, said spring being anchored at the other end to the handle. A lever $h$ in the construction shown in Figs. 1, 2, and 3 is pivoted between its ends to the rake-handle near the rake-head. The lower end of the lever $h$ is provided with an aperture $i$, through which the spring $g$ is passed. The upper end of the lever $h$ is connected with the link $k$, the other end of the link being connected with the lever-handle $l$, which is preferably in the form of a sleeve surrounding the rake-handle. The connections of the link $k$ with the lever $h$ and the handle $l$ are preferably pivotal. The lever $h$ normally slants forward, with its upper end toward the rake-head, in which position the lower end of the lever engages the spring $g$ near its anchored end. With the lever and its connected parts in this position the spring $g$ maintains the cleaning-fingers against the head of the rake. In order to depress the cleaning-fingers to clean the rake, the lever $h$ is moved to a perpendicular position with reference to the handle, whereby the free end of the spring is depressed, together with the cleaning-fingers supported thereby. The movement of the lever $h$ to a vertical position is accomplished by drawing the sleeve $l$ toward the user. After the rake has been cleaned the lever $h$ is restored to the position shown by a forward movement of the sleeve $l$ toward the rake, whereupon the cleaning-teeth are restored to their position close to the rake-head by the spring $g$.

In the modification shown in Fig. 4 a bell-crank lever $m$ is employed in place of the straight lever $h$. The lever $m$ is pivoted at its elbow to the handle of the rake, the longer arm of the lever having separable engagement with the cleaning member, while the shorter arm is connected with the link $k$. The handle $n$ in the form shown in Fig. 4 is pivotally mounted upon the rake-handle. By moving the handle $n$ toward the rake the longer arm of the bell-crank lever is engaged with the cleaner and depresses the same. When the handle $n$ is released, the spring $g$ forces the cleaner back to its normal position.

I do not wish to be limited to the precise construction shown; but,

Having thus described my invention, I claim as new, and desire to secure by Letters Patent, the following:

1. The combination with a rake-head, of a plurality of teeth carried thereby, a plurality of cleaning-teeth, two cleaning-teeth being associated with and closely embracing each rake-tooth, a space being provided between the cleaning-teeth disposed between adjacent rake-teeth, and a head for supporting the cleaning-teeth, substantially as described.

2. The combination with a rake-head and a handle therefor, of a plurality of teeth carried by the rake-head extending transversely of the handle, a plurality of cleaning-teeth extending longitudinally of the handle, two cleaning-teeth being associated with and closely embracing each rake-tooth, a space being provided between the cleaning-teeth disposed between adjacent rake-teeth, and a head for supporting the cleaning-teeth, substantially as described.

3. The combination with a rake-head and a handle therefor, of a plurality of teeth carried by the rake-head extending transversely of the handle, a plurality of cleaning-teeth extending longitudinally of the handle, two cleaning-teeth being associated with and closely embracing each rake-tooth, a space being provided between the cleaning-teeth disposed between adjacent rake-teeth, a head for supporting the cleaning-teeth, a spring for holding the cleaner-head close to the rake-head, and a lever for depressing the cleaner-head against the force of the spring, substantially as described.

4. The combination with a rake-head and a handle therefor, of a plurality of teeth carried by the rake-head extending transversely of the handle, a plurality of cleaning-teeth extending longitudinally of the handle, two cleaning-teeth being associated with and closely embracing each rake-tooth, a space being provided between the cleaning-teeth disposed between adjacent rake-teeth, a head for supporting the cleaning-teeth, a curved strip metal spring $g$ provided beneath the handle of the rake and secured at one end thereto, the cleaner-head being mounted upon the free end of the spring, a lever adapted for engagement with the spring and thereby to depress the free end thereof to actuate the cleaner, and a lever-handle mounted upon the rake-handle for actuating the spring, substantially as described.

5. The combination with a rake-head and a handle therefor, of a plurality of teeth carried by the rake-head extending transversely of the handle, a plurality of cleaning-teeth extending longitudinally of the handle, a head for supporting the cleaning-teeth, a curved strip metal spring $g$ provided beneath the handle of the rake and secured at one end thereto, the cleaner-head being mounted upon the free end of the spring, a lever adapted for engagement with the spring and thereby to depress the free end thereof to actuate the cleaner, and a lever-handle mounted upon the rake-handle for actuating the spring, substantially as described.

In witness whereof I hereunto subscribe my name this 19th day of September, A. D. 1899.

JOHN C. WALTERS.

Witnesses:
 EDNA WALTERS,
 E. M. SHANKLIN.